(12) United States Patent
Mathony et al.

(10) Patent No.: US 10,449,915 B2
(45) Date of Patent: Oct. 22, 2019

(54) SYSTEM FOR TRANSMITTING A PIECE OF INFORMATION TO A SUBUNIT

(71) Applicant: Robert Bosch GmbH, Stuttgart (DE)

(72) Inventors: Hans-Joerg Mathony, Tamm-Hohenstange (DE); Burkhard Iske, Suzhou (CN); Albrecht Irion, Stuttgart (DE); Maik Hansen, Leonberg (DE); Marcus Schneider, Ludwigsburg (DE); Michael Schumann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 438 days.

(21) Appl. No.: 15/317,624

(22) PCT Filed: Jun. 8, 2015

(86) PCT No.: PCT/EP2015/062639
§ 371 (c)(1),
(2) Date: Dec. 9, 2016

(87) PCT Pub. No.: WO2015/193130
PCT Pub. Date: Dec. 23, 2015

(65) Prior Publication Data
US 2017/0106818 A1    Apr. 20, 2017

(30) Foreign Application Priority Data
Jun. 18, 2014  (DE) .................. 10 2014 211 705

(51) Int. Cl.
*B60R 16/023* (2006.01)
*H01R 13/645* (2006.01)
(Continued)

(52) U.S. Cl.
CPC ........ *B60R 16/0231* (2013.01); *B60R 16/023* (2013.01); *G01D 11/30* (2013.01);
(Continued)

(58) Field of Classification Search
CPC ............ H01R 13/6453; H01R 13/6683; Y10S 439/955
See application file for complete search history.

(56) References Cited

U.S. PATENT DOCUMENTS 5,568,610 A * 10/1996 Brown ................ G06F 13/4072
439/955
5,997,360 A * 12/1999 Gen-Kuong ........... G01H 1/003
439/700
(Continued)

FOREIGN PATENT DOCUMENTS

CN       103261844 A    8/2013
DE       19815843 A1    10/1998
(Continued)

OTHER PUBLICATIONS

International Search Report issued in PCT/EP2015/062639 dated Sep. 2, 2015.

*Primary Examiner* — Tho D Ta
(74) *Attorney, Agent, or Firm* — Norton Rose Fulbright US LLP; Gerard Messina

(57) ABSTRACT

A system for transmitting a piece of information to a subunit, including at least one connection position and at least one subunit, the at least one connection position being configured for accommodating a subunit, and the at least one connection position including at least one coding lug which is configured for engaging into a corresponding recess on a subunit, the arrangement of the at least one coding lug coding the piece of information to be transmitted, and the at least one subunit having at least one recess which is configured for contactlessly detecting the presence of a coding lug in a recess.

12 Claims, 2 Drawing Sheets

(51) Int. Cl.
*G01D 11/30* (2006.01)
*H04B 5/00* (2006.01)
*H01R 13/66* (2006.01)

(52) U.S. Cl.
CPC ....... *H01R 13/6453* (2013.01); *H04B 5/0031* (2013.01); *H01R 13/6683* (2013.01); *Y10S 439/955* (2013.01)

(56) References Cited

U.S. PATENT DOCUMENTS

| 6,974,342 B2* | 12/2005 | Thomas | H01R 13/64 439/222 |
|---|---|---|---|
| 2009/0183558 A1 | 7/2009 | Houjie et al. | |
| 2011/0021930 A1 | 1/2011 | Mazzeo et al. | |

FOREIGN PATENT DOCUMENTS

| DE | 19945337 A1 | 3/2001 |
|---|---|---|
| JP | 2009224187 A | 10/2009 |
| WO | 03055726 A1 | 7/2003 |

* cited by examiner

SYSTEM FOR TRANSMITTING A PIECE OF INFORMATION TO A SUBUNIT

FIELD

The present invention relates to a system for transmitting a piece of information to a subunit, including at least one connection position and at least one subunit, the connection position being configured for accommodating the subunit. The present invention also relates to a vehicle which includes such a system.

The present invention also relates to a vehicle including such a system, and to subunits and connection positions for use in such a system.

BACKGROUND INFORMATION

The increasing traffic density of motor vehicles more and more frequently results in critical driving situations. Therefore, modern vehicles are equipped with a multitude of assistance systems which assist the driver in the guidance of the motor vehicle. In order to function, these assistance systems, in turn, are reliant upon a multitude of sensors which detect the vehicle surroundings. The problem arises here that every single sensor must be connected to a control unit for the data evaluation, and the control unit for each sensor must unambiguously know the installation position of the sensor in order to correctly assign the data. Data busses are utilized in order to reduce the complexity of the wiring between the sensors and the control unit, so that a multitude of sensors may be connected to one wire harness. A simple assignment between the installation position of a sensor and the data line assigned to the sensor is no longer the case, however, and, in principle, multiple possible installation positions are now considered for a sensor connected to the data bus.

German Patent Application No. DE 199 45 337 A1 describes a system for transmitting data between subunits and a control unit. Microswitches are assigned to the individual subunits, the function of the subunits being adjusted via the position of the microswitches. When a subunit is installed, the microswitches are pressed against an installation wall at which corresponding pins are located, which apply a resistance against the microswitch. The positions of the microswitches also provide the subunits with an address which is utilized as an identification bit in a data structure during the communication via a bus.

The sensors utilized in the vehicle surroundings are frequently exposed to environmental influences, such as moisture, oils, salts, etc., without further protective measures. Therefore, it is desirable to provide a system, via which a coding may be transmitted to a sensor which is resistant to environmental influences and which does not require additional electrical contacts.

SUMMARY

A system for transmitting a piece of information to a subunit is described, including at least one connection position and at least one subunit, the connection position being configured for accommodating the subunit, and the connection position including at least one coding lug which is configured for engaging into a corresponding recess on a subunit, the arrangement of which coding the piece of information to be transmitted, and the subunit having at least one recess which includes means for contactlessly detecting the presence of the coding lug in the recess.

The system is installed in a motor vehicle, for example, the system including connection positions at different points in the motor vehicle. Preferably, the subunits are sensors for detecting the surroundings of a vehicle and the connection positions are preferably designed as mountings for the sensors. The sensors are designed, for example, as ultrasonic sensors, radar sensors, LIDAR sensors, or the like. For example, the system has between one and 50 connection positions.

Generally, a power supply and a data connection to a control unit are required for the operation of the subunits. For this purpose, corresponding means are provided at the connection positions for establishing an electrical connection. Since the connection positions are usually exposed to environmental influences such as moisture, oils, and salts, which may corrode the electrical contacts, these contacts must be appropriately equipped, on the one hand and, on the other hand, it is desirable to reduce the number of contacts. According to the present invention, therefore, no further electrical contacts are provided for transmitting a piece of information to a subunit, but rather providing coding lugs, at the connection positions, which are configured for engaging into recesses on the subunits. For this purpose, the subunits have at least one recess; generally, these subunits have at least two recesses, the information taking place via the presence or absence of a coding lug. For example, the presence of a coding lug may be valued as a logic 1 and the absence of a coding lug may be valued as a logic 0. With the aid of two coding lugs, it is therefore already possible to identify four states; with the aid of three coding lugs, it is possible to identify eight possible states, etc.

In further specific embodiments, it may be provided to not only establish the presence or absence of a coding lug, but rather to also detect a height of the coding lug, or to detect the extent to which a coding lug engages into the recess. In this case, more than two possible states may be coded with the aid of one coding lug. If coding lugs having three different heights are utilized, for example, then one coding lug may identify a total of four different states, namely three states assigned to the different heights and the state that no coding lug is present.

The particular subunits contactlessly detect the presence or absence of a coding lug in a recess. Since no electrical contacts need be routed toward the outside in order to detect a coding lug, the housing of the subunit may be designed to be closed, which improves the resistivity of the system with respect to environmental influences.

The subunits include means, with the aid of which the subunits capacitively, inductively, or magnetically detect the presence of a coding lug in one of their recesses. These means are provided in the interior of the subunit. In the case of a magnetic detection, for example, the means are designed as a magnetic sensor, for example, as a Hall effect sensor. In the case of a capacitive or inductive measurement, these means may be in the form of a conductor loop routed around the recess.

A capacitance or an impedance may be measured with the aid of this conductor loop. The measured capacitance or impedance is dependent on whether an object is located in the recess. Therefore, if a coding lug engages into a recess of a connection position after the installation of a subunit, the electrical properties change, which are then detected via a change in capacitance or a change in impedance.

Such a change in the capacitance or the impedance takes place regardless of the type of material used to produce the coding lug. For example, in one variant of the present invention, in which the connection positions are designed as mountings for sensors, the coding lugs are made from the same material as the mountings.

In further specific embodiments, the coding lug may be additionally designed to be metallic or magnetic in order to simplify the detection of a coding lug. The magnetic embodiment is necessary when a Hall sensor is to be utilized for the contactless detection.

The electrical contacts necessary for the communication of the subunit with a central control unit are preferably designed as contacts, with the aid of which the subunit is connectable to a bus. In a data bus, all units connected to the bus share the same wire harness, so that the complexity of the wiring in the system is minimized.

In this case, it is preferred that the information, which is transmitted to the subunit, represents an identifier for the communication via the bus.

If all subunits communicate with each other and with a control unit via a shared bus, each bus participant requires an unambiguous identifier in order to be identifiable, on the one hand and, on the other hand, in order to be directly addressable by the control unit. If four recesses, for example, are provided, into which the coding lugs engage and may assume three different states as a result of different heights, then the number of coding possibilities which result is 2 to the power of 12, i.e., 4096.

In one further specific embodiment of the present invention, the piece of information to be transmitted to the subunit represents a connection position in the system, a functional feature and/or a piece of correction information.

If the connection position of the subunit in the system is known to the subunit, the subunit may communicate its position to a control unit, so that the control unit may correctly assign the data delivered by the subunit.

If the piece of information represents a functional feature, the subunit may be configured solely by way of the connection to a certain connection position. The transmitted functional features may, for example, activate certain functions of a subunit or, for example, configure their function, for example, in the case of a sensor, establish the measuring range of the sensor, or, for example, establish whether the sensor is utilized exclusively as a receiver or as a transmitter or as a combined transceiver.

In addition, it is possible in one variant of the present invention to also transmit correction information, so that the subunit may consider particularities of its installation site.

Further aspects of the present invention relate to subunits and connection positions for use in such a system.

One further aspect of the present invention relates to a vehicle which includes such a system.

The connection positions are those positions at which mountings for sensors are situated on the vehicle. The connection positions include coding lugs which unambiguously identify each individual connection position, so that all sensors utilized as subunits in the system may be initially designed identical and receive their individual coding only upon insertion into a connection position.

Due to the system according to the present invention, a simple possibility is provided for unambiguously identifying and/or configuring, for example, sensors, depending on their installation position, the sensors all being designed to be identical. In this case, it is possible to connect all sensors to one control unit via a shared data bus, the installation position of a sensor being unambiguously ascertainable. The individual sensors receive the piece of information regarding their installation site via the coding with the aid of the coding lugs and may forward the piece of information to the control unit via the data bus.

Advantageously, no further electrical contacts are necessary for transmitting the piece of information to the subunits. Likewise, it is not necessary to place movable mechanical parts such as, for example, microswitches, on the subunits, which are accessible from the outside. The housing of the subunits may be designed to be largely closed; only the electrical contacts necessary for a power supply and for the communication via a data bus must still be provided.

Due to the omission of further electrical contacts or mechanical switches, an environmental influence, for example, by moisture, oils, or salts which effectuate a corrosion of electrical contacts, is largely avoided. The reliability of the information transmission and, therefore, of the entire system, is substantially increased.

Due to the largely closed design, the omission of mechanical switches, and the minimization of the number of electrical contacts, the system is extremely robust against contamination and corrosion.

In the simplest embodiment variants, the subunits include means, with the aid of which the subunits capacitively, inductively, or magnetically detect the presence of a coding lug in one of their recesses. These means are provided in the interior of the subunit. In the case of a magnetic detection, for example, the means are designed as a magnetic sensor, for example, as a Hall effect sensor. In the case of a capacitive or inductive measurement, these means may be in the form of a conductor loop routed around the recess.

DETAILED DESCRIPTION OF EXAMPLE EMBODIMENTS

Figure 1:
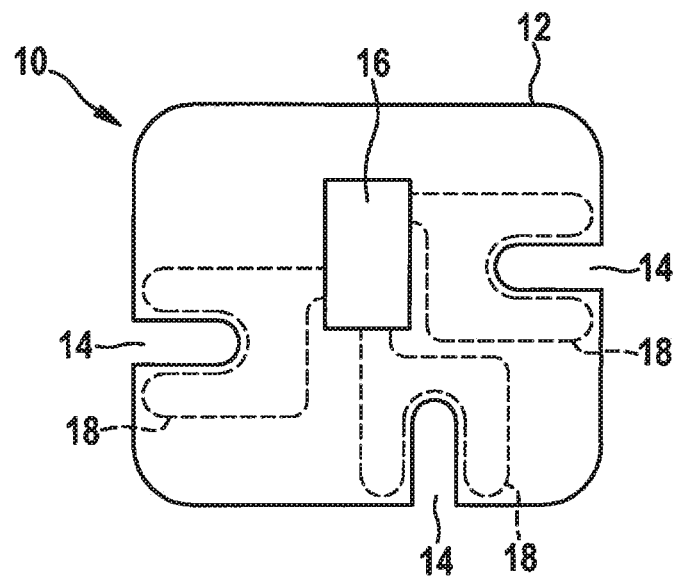
FIG. 1 shows a schematic representation of a subunit.

In the following description of the exemplary embodiments of the present invention, the same or similar components and elements are labeled using the same reference numerals, a repeated description of these components or elements in individual cases being dispensed with. The figures represent the subject matter of the present invention only schematically.

A subunit 10 is schematically represented in FIG. 1. In the view, subunit 10 is shown in a sectional representation from above. Subunit 10 includes a housing 12 which is configured for being inserted into a connection position 20 (see FIG. 2). In the specific embodiment represented in FIG. 1, housing 12 has three recesses 14. It is apparent in the sectional representation that one conductor loop 18 which is connected to a control unit 16 is assigned to each recess 14. Each conductor loop 18 is routed around one of the recesses 14, starting from control unit 16.

Control unit 16 may measure electrical parameters such as capacitance or impedance via conductor loops 18. These electrical parameters are dependent on whether an object is located in recess 14. If an object is inserted into one of the recesses 14, then the electrical properties change, which, in turn may be measured via a change in the capacitance or via a change in the impedance. Therefore, control unit 16 may establish whether an object is located in a recess 14, without the need for a mechanical or electrical contact to take place.

In further specific embodiments of the present invention, it is possible to additionally or alternatively assign a magnetic sensor, for example, a Hall effect sensor, to a conductor loop 18 of each recess 14. Such a sensor would detect, in particular, whether a magnetized material has been inserted into one of the recesses 14.

It is likewise possible in further specific embodiments of the present invention to provide another number of recesses 14. With the aid of each recess 14, one logic bit may be detected, namely the presence or absence of an object in recess 14. The number of the assigned recesses 14 is generally selected in such a way that the required information may be coded. The number of codable states is $2^n$ in this case, n corresponding to the number of recesses 14.

Figure 2:
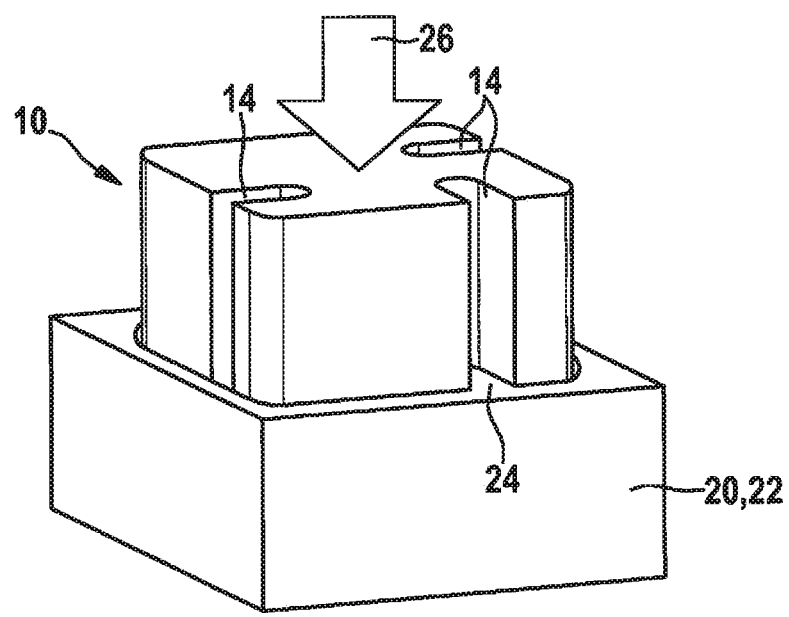
FIG. 2 shows the insertion of a subunit into a connection position.

FIG. 2 shows the insertion of a subunit 10 into a connection position 20. Subunit 10 is inserted from above in direction 26 into a connection position 20 designed as a mounting 22. Mounting 22 includes a coding lug 24 which engages into a corresponding recess 14 of subunit 10 upon insertion of subunit 10 into connection position 20.

Depending on the specific embodiment of the device, subunit 10 is designed, for example, for detecting surroundings and mounting 22 is situated at an installation site in a vehicle intended for the surroundings sensor. In terms of the driver assistance systems of the vehicle, it is important to know which sensor or which subunit 10 was inserted into which connection position 20. If possible connection positions 20 are coded by way of an unambiguous placement of coding lugs 24 into connection positions 20, control unit 16 of a subunit 10 may detect its installation site via the coding, with the aid of coding lugs 24, and communicate this installation position via a data bus to other control units in the vehicle.

Figure 3A:
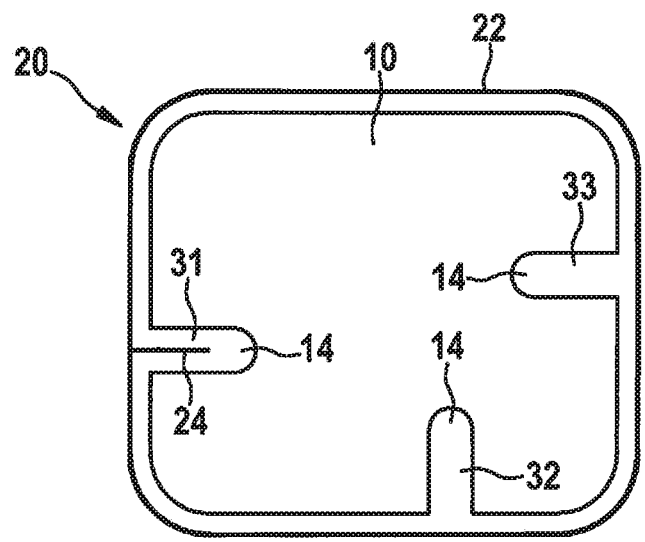
FIGS. 3A and 3B show two examples of the arrangement of coding lugs in a connection position.
Figure 3B:
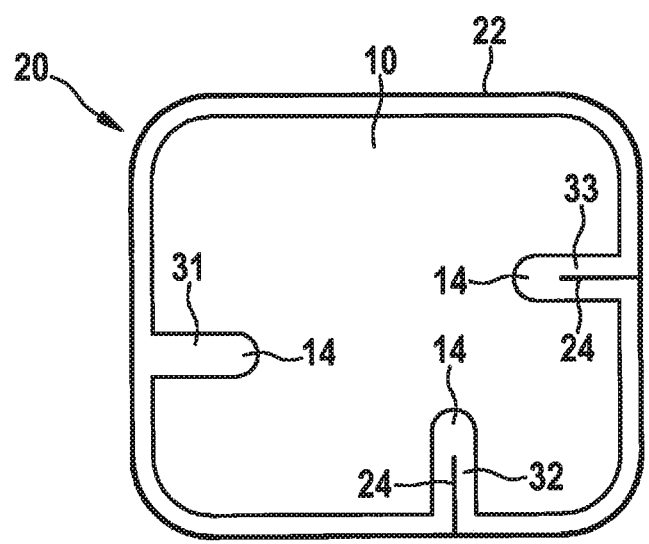

Two different codings of a connection position 20 are represented in FIGS. 3A and 3B.

Connection positions 20 each designed as mounting 22 are represented in FIGS. 3A and 3B. A subunit 10 is inserted into the mounting 22 in each case. In the specific embodiment represented, each of the subunits 10 has three recesses 14. One coding lug 24 may engage into each of the recesses 14. This results in three possible positions 31, 32, 33 at which a coding lug 24 may be situated.

In the specific embodiment represented in FIG. 3A, a coding lug 24 is located in first position 31 and engages into corresponding recess 14 of subunit 10.

In FIG. 3B, a coding lug 24 is situated in second position 32 and a coding lug 24 is situated in third position 33.

The different coding via coding lugs 24 may be contactlessly detected by subunit 10 by ascertaining the presence or absence of a coding lug 24 in particular recess 14. On the basis of the information obtained in this way, subunit 10 may infer, for example, its installation position in the system. In further specific embodiments, this piece of information may additionally or alternatively contain a unique ID for the communication via a data bus or, for example, transmit configuration or correction information to subunit 10. Such pieces of configuration information may include, for example, that a subunit 10 designed as a sensor is to work with another measuring range at certain connection positions 20 other than connection positions 20.

The present invention is not limited to the exemplary embodiments described here and to the aspects emphasized therein. A multitude of modifications which are within the capabilities of those skilled in the art may rather be possible within the scope of the present invention.

What is claimed is:

1. A system for transmitting a piece of information to a subunit, comprising:
a mounting unit having at least one connection position; and
at least one subunit, the at least one connection position of the mounting unit being configured for accommodating the at least one subunit, wherein the connection position includes at least one coding lug to engage into a corresponding recess on the subunit, an arrangement of the coding lug coding the piece of information to be transmitted, and the subunit having at least one interior recess which includes a sensor to contactlessly detect the presence of the coding lug in the corresponding recess;
wherein the sensor is located in the interior recess of the at least one subunit to contactlessly detect one of capacitively, inductively or magnetically.

2. The system as recited in claim 1, wherein the sensor detects the presence of the coding lug in the recess includes at least one of a conductor loop and a magnetic sensor.

3. The system as recited in claim 1, wherein the at least one coding lug is at least one of metallic or magnetic.

4. The system as recited in claim 1, wherein the sensor of the subunit includes one of an ultrasonic sensor, a LIDAR sensor, and a radar sensor.

5. The system as recited in claim 1, wherein the connection position includes electrical contacts, by which the subunit is connectable, wherein the electrical contacts are for a power supply and for communication.

6. The system as recited in claim 5, wherein the piece of information represents an identifier for communication.

7. The system as recited in claim 6, wherein the piece of information represents at least one of the connection position in the system, a functional feature, and a piece of correction information.

8. The system as recited in claim 1, wherein the at least one subunit includes the sensor, which is mounted in the at least one connection position.

9. The system as recited in claim 8, wherein the coding lug is made from the same material as the mounting.

10. A vehicle including a system for transmitting a piece of information to a subunit, comprising:
a mounting unit having at least one connection position; and
at least one subunit, the at least one connection position of the mounting unit being configured for accommodating the at least one subunit, wherein the connection position includes at least one coding lug to engage into a corresponding recess on the subunit, an arrangement of the coding lug coding the piece of information to be transmitted, and the subunit having at least one interior recess which includes a sensor to contactlessly detect the presence of the coding lug in the corresponding recess;
wherein the sensor is located in the interior recess of the at least one subunit to contactlessly detect one of capacitively, inductively or magnetically.

11. A subunit, comprising:
a subunit device configured to be accommodated in at least one connection position of a mounting unit, the connection position includes at least one coding lug to engage into a corresponding recess on the subunit device, an arrangement of the coding lug coding a piece of information to be transmitted to the subunit device, and the subunit device having at least one recess which includes a sensor to contactlessly detect the presence of the coding lug in the corresponding recess;

wherein the sensor is located in the interior recess of the at least one subunit to contactlessly detect one of capacitively, inductively or magnetically.

12. A connection device, comprising:

a mounting unit having at least one connection position configured for accommodating a subunit, the connection position including at least one coding lug to engage into a corresponding recess on the subunit, an arrangement of the coding lug coding a piece of information to the transmitted to the subunit, and the subunit having at least one interior recess which includes a sensor to contactlessly detect the presence of the coding lug in the corresponding recess;

wherein the sensor is located in the interior recess of the at least one subunit to contactlessly detect one of capacitively, inductively or magnetically.

* * * * *